US012054675B2

(12) United States Patent
Patel et al.

(10) Patent No.: US 12,054,675 B2
(45) Date of Patent: Aug. 6, 2024

(54) EXTRACTIVE SOLIDS REMOVAL FROM HEAVY FRACTIONS

(71) Applicant: EXXONMOBIL TECHNOLOGY AND ENGINEERING COMPANY, Annandale, NJ (US)

(72) Inventors: Bryan A. Patel, Jersey City, NJ (US); Brenda A. Raich, Annandale, NJ (US); Keith K. Aldous, Montgomery, TX (US)

(73) Assignee: EXXONMOBIL TECHNOLOGY AND ENGINEERING COMPANY, Annandale, NJ (US)

(*) Notice: Subject to any disclaimer, the term of this patent is extended or adjusted under 35 U.S.C. 154(b) by 127 days.

(21) Appl. No.: 17/904,888

(22) PCT Filed: Mar. 31, 2020

(86) PCT No.: PCT/US2020/025938
§ 371 (c)(1),
(2) Date: Aug. 24, 2022

(87) PCT Pub. No.: WO2021/201841
PCT Pub. Date: Oct. 7, 2021

(65) Prior Publication Data
US 2023/0131108 A1    Apr. 27, 2023

(51) Int. Cl.
*B01D 3/10* (2006.01)
*B01D 3/14* (2006.01)
(Continued)

(52) U.S. Cl.
CPC .............. *C10G 1/045* (2013.01); *B01D 3/10* (2013.01); *B01D 3/143* (2013.01); *B01D 21/262* (2013.01);
(Continued)

(58) Field of Classification Search
CPC ........ B01D 21/262; B01D 3/10; B01D 3/143; C10G 1/002; C10G 1/045; C10G 21/14;
(Continued)

(56) References Cited

U.S. PATENT DOCUMENTS 4,211,633 A * 7/1980 Gleim ....................... C10C 1/18
208/309
2012/0247943 A1  10/2012 Noe et al.
(Continued)

FOREIGN PATENT DOCUMENTS

WO    2004080929 A2    9/2004
WO    2021201841 A1    10/2021

OTHER PUBLICATIONS

Written and International Search Report of corresponding PCT application No. PCT/US2020/025938 mailed Dec. 24, 2020.

*Primary Examiner* — Ellen M McAvoy
*Assistant Examiner* — Chantel Graham
(74) *Attorney, Agent, or Firm* — Vorys, Sater, Seymour and Pease, LLP

(57) ABSTRACT

Systems and methods are provided for separation of particles and/or asphaltenes from heavy hydrocarbon fractions. The heavy hydrocarbon fraction can correspond to a feed including particles or a processing effluent that includes particles. If the heavy hydrocarbon fraction is mixed with lower boiling fractions, a separation can be performed to reduce or minimize the amount of hydrocarbons that are present in the heavy hydrocarbon fraction. The heavy hydrocarbon fraction can then be mixed with a sufficient amount of a separation solvent to cause a phase separation. One phase can correspond to the separation solvent plus a portion of the hydrocarbons. The other phase can correspond to hydrocarbons rejected by the separation solvent plus the particles from the heavy hydrocarbon fraction. The phases
(Continued)

can then be separated from each other using a solids-liquid centrifugal separator.

15 Claims, 2 Drawing Sheets

(51) Int. Cl.
    *B01D 21/26*     (2006.01)
    *C10G 1/00*     (2006.01)
    *C10G 1/04*     (2006.01)

(52) U.S. Cl.
    CPC ....... *C10G 1/002* (2013.01); *C10G 2300/208* (2013.01); *C10G 2300/44* (2013.01)

(58) Field of Classification Search
    CPC .............. C10G 21/28; C10G 2300/208; C10G 2300/44; C10G 31/10; C10G 67/14; C10G 67/04
    See application file for complete search history.

(56) References Cited

U.S. PATENT DOCUMENTS

| | | | |
|---|---|---|---|
| 2013/0001136 A1* | 1/2013 | Adeyinka | C10G 1/04 196/14.52 |
| 2018/0079971 A1* | 3/2018 | Moravec | B01J 41/05 |
| 2019/0300799 A1 | 10/2019 | Marshall et al. | |

* cited by examiner

EXTRACTIVE SOLIDS REMOVAL FROM HEAVY FRACTIONS

FIELD OF THE INVENTION

Systems and methods are provided separating solid particles from effluents generated by slurry hydrocracking of hydrocarbon feedstocks.

BACKGROUND OF THE INVENTION

Developing effective methods for processing and/or disposition of heavy hydrocarbon fractions including substantial amounts of 1050° F.+ (566° C.+) components is an ongoing challenge. Such heavy hydrocarbon fractions can have a relatively low value without processing, as the value of such feeds for use in asphalt or fuel oil is limited. Unfortunately, such heavy hydrocarbon fractions also have a tendency to cause fouling or other degradation in processing equipment. For some feeds, the tendency to foul can be due to the presence of various sizes of particles within the feed. Additionally or alternately, some feeds have increased fouling tendencies due to the presence of asphaltenes within the feeds. Such asphaltenes may not strictly correspond to solid particles, but can have an increased tendency to convert to solids (such as coke) under various types of processing conditions. As a result, attempting to process such heavy hydrocarbon feeds can require substantial equipment investment in addition to resource investments for reagents and solvents used to process the feeds.

For some types of heavy feeds, slurry hydroprocessing (such as slurry hydroconversion) processes can mitigate some difficulties with processing of challenged feeds. Unlike a fixed bed or trickle bed environment, slurry hydroprocessing involves exposing a feedstock to hydrogen in the presence of a catalyst that is entrained within the feedstock. Slurry hydroprocessing can reduces or minimizes the difficulties associated with rapid coke formation on the catalyst, which often occurs during hydroprocessing of heavy feeds. Additionally, the slurry hydroprocessing environment is designed to handle feeds that include entrained particles. Because of the addition of slurry hydroprocessing catalyst, however, using slurry hydroprocessing to treat a heavy feed typically results in a slurry hydroprocessing effluent with an increased particle content. This slurry hydroprocessing catalyst is typically concentrated in any unconverted portions of the slurry hydroprocessing effluent (relative to a conversion temperature, such as 566° C.). Such unconverted portions typically become part of a bottoms fraction produced during fractionation of the slurry hydroprocessing effluent. One of the constraints on the yield from a slurry hydroprocessing process is the amount of product that is lost due to inability to separate product from the particles. In some systems, this loss of yield is manifested based on the amount of hydrocarbons that are entrained with the solids when the solids are disposed of. In other systems, if high severity slurry hydroprocessing is used, conversion of the feed can be used to minimize the amount of liquid products that are entrained with the solids. However, processing at such severity typically also results in additional production of light ends ($C_1$-$C_3$ hydrocarbons) that have a substantially lower value than liquid products.

What is needed are systems and methods that can facilitate removal of solids and/or asphaltenes from heavy hydrocarbon fractions while reducing or minimizing loss of liquid hydrocarbon yield. Preferably, the systems and methods can be suitable for use in preparing a heavy feed for processing as well as for recovering products from slurry hydroprocessing effluents and/or other effluents having increased particle contents.

SUMMARY

In various aspects, a method for performing a separation on a heavy hydrocarbon feed is provided. The method includes fractionating a heavy hydrocarbon feed to form a bottoms fraction and one or more higher boiling fractions. The bottoms fraction can include a solids content of 500 wppm or more and a hydrocarbon content. The method further includes mixing a separation solvent comprising a $C_5$-$C_{10}$ hydrocarbon with at least a portion of the bottoms fraction at a temperature of 50° C. to 150° C. to form a mixture. The mixture can include an extract phase containing less than 300 wppm of solids and a rejected phase having a solids content of 1000 wppm or more. The extract phase can include at least a portion of the separation solvent and 50 vol % or more of the hydrocarbon content of the bottoms fraction. A volume ratio of the separation solvent to the bottoms fraction can be 1:1 or more. Additionally, the method includes separating the extract phase from the rejected phase in a centrifugal separator.

DETAILED DESCRIPTION

Figure 1:
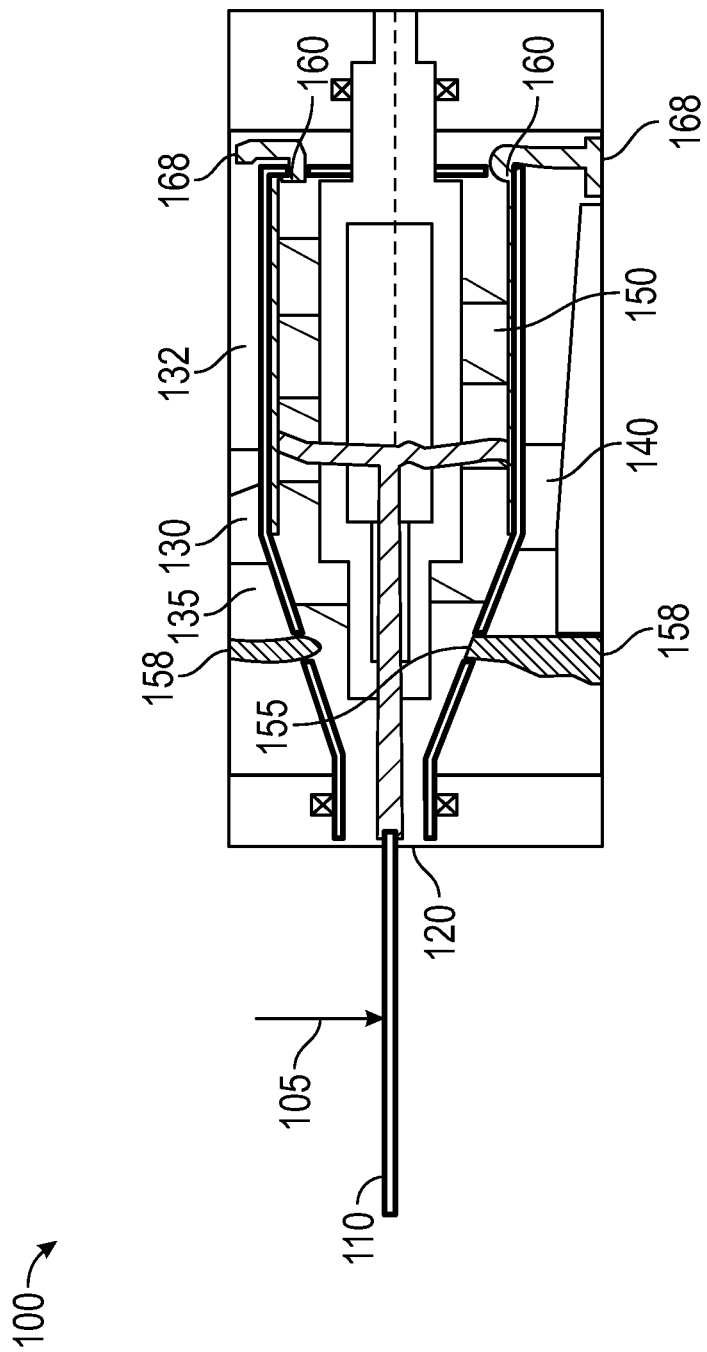
FIG. 1 shows an example of configuration for removal of solids from a heavy fraction using a solids-liquid centrifuge.

All numerical values within the detailed description and the claims herein are modified by "about" or "approximately" the indicated value, and take into account experimental error and variations that would be expected by a person having ordinary skill in the art.

Overview

In various aspects, systems and methods are provided for separation of particles and/or asphaltenes from heavy hydrocarbon fractions. The heavy hydrocarbon fraction can correspond to a feed including particles or a processing effluent that includes particles. If the heavy hydrocarbon fraction is mixed with lower boiling fractions, a separation can be performed to reduce or minimize the amount of hydrocarbons that are present in the heavy hydrocarbon fraction. The heavy hydrocarbon fraction can then be mixed with a sufficient amount of a separation solvent to cause a phase separation. One phase (the extract phase) can correspond to the separation solvent plus a portion of the hydrocarbons. The other phase can correspond to hydrocarbons rejected by the separation solvent plus the particles from the heavy hydrocarbon fraction. The phases can then be separated from each other using a solids-liquid centrifugal separator. This can allow for recovery of 75 vol % or more of the hydrocarbons from the heavy hydrocarbon fraction as part of the extract phase, or 80 vol % or more, or 90 vol % or more, such as up to 95 vol % or possibly still higher.

Various types of particles can be present in a heavy hydrocarbon fraction. Some particles can correspond to traditional particles, such as catalyst particles used for a slurry hydroprocessing reaction, sand particles, or clay fines remaining in a bitumen that is formed by paraffinic froth treatment of oil sands. Other particles can correspond to toluene insolubles that may or may not be solids, but that are sufficiently viscous to cause clogging or fouling of equipment in a manner similar particles. In addition to naturally occurring toluene insolubles, such toluene insolubles can be formed during steam cracking of crude oils.

In order to make a fraction suitable for further processing, it is often desirable to reduce the solids content of a fraction to 300 wppm or less. Some recovery of hydrocarbons from a solids-containing fraction can be performed by fractionation. While this can often separate a majority of the hydrocarbons, such fractionation leaves behind a bottoms fraction containing the solids.

Further removal of particles from the bottoms fraction to reach a solids content of 300 wppm or less can present a variety of challenges. Some problems are related to the range of particle sizes. For example, in many types of heavy hydrocarbon fractions, some particles can correspond to particle "fines" of less than 50 µm in size. In bitumens derived from oil sands, a substantial portion of particles can correspond to clay fines having a size of roughly 1.0 µm or less. Another substantial portion of the particles can correspond to particles with sizes greater than 100 µm. Other difficulties can be related to the high viscosity of typical heavy hydrocarbon fractions. Due in part to the combination of high viscosity, high particle count, and the wide range of particles sizes, attempting to remove particles by filtration tends to lead to rapid fouling and/or clogging of filters. Heavy hydrocarbon fractions with a wide range of particle sizes also pose problems for the operation of centrifugal separation systems, such as centrifuges or hydrocyclones. For small particles with a low difference in density relative to the hydrocarbons, particles within a pitch sample can remain distributed through a large portion of the pitch sample after a centrifugal separation, thus reducing the amount of hydrocarbon that can be recovered as a low solids product.

Instead of attempting to directly perform a separation on a heavy hydrocarbon fraction, in various aspects the heavy hydrocarbon fraction can be optionally fractionated to form a bottoms fraction containing the particles. The bottoms fraction can then be blended with a separation solvent. Suitable separation solvents can include $C_5$-$C_{10}$ paraffins, either individually or in combination. By mixing the bottoms fraction with a separation solvent, a phase separation can occur so that a majority of the hydrocarbon from the bottoms fraction enters the solvent phase while the particles remain in in a smaller, secondary phase that is rejected by the solvent. By separating out a majority of the hydrocarbon into the solvent phase, increased recoveries of hydrocarbons can be achieved while still obtaining a desired solids content, such as a solids content of 300 wppm or less. In some aspects, using a separation solvent can allow for recovery of 75 vol % or more of the hydrocarbons in the bottoms fraction, or 80 vol % or more, or 90 vol % or more, such as up to 95 vol % or possibly still higher.

As an example, a slurry hydroprocessing effluent can be an effluent that includes heavy hydrocarbon fraction. The heavy hydrocarbon fraction of the slurry hydroprocessing effluent can be mixed with a separation solvent and then separated using a centrifugal separator in order to separate particles from the fraction while reducing or minimizing yield loss. First, the slurry hydroprocessing effluent can be fractionated to form one or more lower boiling fractions and a bottoms fraction containing the particles in the slurry hydroprocessing effluent. The bottoms fraction can then be mixed with a separation solvent, followed by separation of particles in a centrifugal solids-liquid separator. Using a separation solvent to facilitate separation of hydrocarbons from the slurry hydroprocessing bottoms fraction can reduce the amount of hydrocarbons in the rejected phase to 5.0 wt % or less of the total hydrocarbons in the slurry hydroprocessing effluent, or 4.0 wt % or less, or 3.0 wt % or less, or 2.0 wt % or less, such as down to 1.0 wt % or possibly still lower. In this discussion, the total hydrocarbons in the slurry hydroprocessing effluent includes both hydrocarbons that are gas phase at 100 kPa-a and 20° C. as well as hydrocarbons that are liquid phase at 100 kPa-a and 20° C.

The amount of catalyst in a slurry hydroprocessing effluent is typically 100 wppm or more. Fractionation to separate a bottoms fraction from the remaining portion of the slurry hydroprocessing effluent generally results in a bottoms fraction corresponding to a third or less of the total effluent. As a result, even under slurry hydroprocessing conditions with a relatively low catalyst, concentration, the solids content of the bottoms fraction can be greater than 300 wppm. More generally, the solids content of the bottoms fraction can be 500 wppm to 200,000 wppm, or 5000 wppm to 200,000 wppm, or 500 wppm to 50,000 wppm, or 5000 wppm to 50,000 wppm. In some aspects, it is noted that if the slurry hydroprocessing feedstock is derived from oil sands (or another similar type of petroleum source), a portion of the solids content in the bottoms fraction can correspond to clay fines or sand particles that were not removed during a prior froth treatment.

Definitions

In this discussion, unless otherwise specified, "conversion" of a feedstock or other input stream is defined as conversion relative to a conversion temperature of 524° C. (975° F.). Per-pass conversion refers to the amount of conversion that occurs during a single pass through a reactor/stage/reaction system. It is noted that recirculation streams (i.e., streams having substantially the same composition as the liquid in the reactor) are considered as part of the reactor, and therefore are included in the calculation of per-pass conversion. Net or overall conversion refers to the net products from the reactor/stage/reaction system, so that any recycle streams are included in the calculation of the net or overall conversion. It is noted that in all aspects described herein, the amount of conversion at 524° C. is lower than the corresponding conversion at 566° C.

In this discussion, the Liquid Hourly Space Velocity (LHSV) for a feed or a portion of a feed to a slurry hydrocracking reactor is defined as the volume of feed per hour relative to the volume of the reactor.

In this discussion, a "$C_x$" hydrocarbon refers to a hydrocarbon compound that includes "x" number of carbons in the compound. A stream containing "$C_x$-$C_y$" hydrocarbons refers to a stream composed of one or more hydrocarbon compounds that includes at least "x" carbons and no more than "y" carbons in the compound. It is noted that a stream comprising $C_x$-$C_y$ hydrocarbons may also include other types of hydrocarbons, unless otherwise specified.

In this discussion, "Tx" refers to the temperature at which a weight fraction "x" of a sample can be boiled or distilled. For example, if 40 wt % of a sample has a boiling point of 343° C. or less, the sample can be described as having a T40 distillation point of 343° C. In this discussion, boiling points can be determined by a convenient method based on the boiling range of the sample. This can correspond to ASTM D2887, or for heavier samples ASTM D7169.

In this discussion, references to "fresh feed" to a hydroconversion stage correspond to feedstock that has not been previously passed through the hydroconversion stage. This is in contrast to recycled feed portions that are formed by fractionation and/or other separation of the products from the hydroconversion stage.

In various aspects of the invention, reference may be made to one or more types of fractions generated during distillation of a petroleum feedstock, intermediate product, and/or product. Such fractions may include naphtha fractions, distillate fuel fractions, and vacuum gas oil fractions. Each of these types of fractions can be defined based on a boiling range, such as a boiling range that includes at least 90 wt % of the fraction, or at least 95 wt % of the fraction. For example, for naphtha fractions, at least 90 wt % of the fraction, or at least 95 wt %, can have a boiling point in the range of 85° F. (29° C.) to 350° F. (177° C.). It is noted that 29° C. roughly corresponds to the boiling point of isopentane, a $C_5$ hydrocarbon. For a distillate fuel fraction, at least 90 wt % of the fraction, or at least 95 wt %, can have a boiling point in the range of 350° F. (177° C.) to 650° F. (343° C.). For a vacuum gas oil fraction, at least 90 wt % of the fraction, or at least 95 wt %, can have a boiling point in the range of 650° F. (343° C.) to 1050° F. (566° C.). Fractions boiling below the naphtha range can sometimes be referred to as light ends. Fractions boiling above the vacuum gas oil range can be referred to as vacuum resid fractions or pitch fractions.

Another option for specifying various types of boiling ranges can be based on a combination of T5 (or T10) and T95 (or T90) distillation points. For example, in some aspects, having at least 90 wt % of a fraction boil in the naphtha boiling range can correspond to having a T5 distillation point of 29° C. or more and a T95 distillation point of 177° C. or less. In some aspects, having at least 90 wt % of a fraction boil in the distillate boiling range can correspond to having a T5 distillation point of 177° C. or more and a T95 distillation point of 343° C. or less. In some aspects, having at least 90 wt % of a fraction boil in the vacuum gas oil range can correspond to having a T5 distillation point of 343° C. or more and a T95 distillation point of 566° C. or less.

In this discussion, the boiling range of components in a feed, intermediate product, and/or final product may alternatively be described based on describing a weight percentage of components that boil within a defined range. The defined range can correspond to a range with an upper bound, such as components that boil at less than 177° C. (referred to as 177° C.–); a range with a lower bound, such as components that boil at greater than 566° C. (referred to as 566° C.+); or a range with both an upper bound and a lower bound, such as 343° C.-566° C.

Heavy Hydrocarbon Fractions

In various aspects, a separation solvent can be added to a heavy hydrocarbon fraction in order to facilitate separation of hydrocarbons from the heavy hydrocarbon fraction while reducing or minimizing the particle content of the separated hydrocarbons. In some aspects, the amount of toluene insolubles in a heavy hydrocarbon fraction can also be reduced or minimized. Toluene insoluble compounds in a heavy hydrocarbon fraction are defined in accordance with and can be characterized according to ASTM D4072.

A variety of heavy hydrocarbon fractions can correspond to fractions that include particles and/or toluene insolubles. Some heavy hydrocarbon fractions can correspond to at least a portion of a whole or partial crude oil. Such whole or partial crude oils can be derived from traditional or non-traditional sources. An example of a whole or partial crude oil derived from a non-traditional source can be a bitumen that is formed by performing a paraffinic froth treatment or a naphtha froth treatment on oil sands.

Froth treatments can be used to assist with separation of the hydrocarbons in oil sands from inorganic particulate matter. Depending on the nature of the froth treatment, the particle content of a bitumen derived from oil sands can have a particle content of 100 wppm to 10,000 wppm, or possibly higher. It is noted that bitumens typically contain components with a wide boiling range, so that a significant portion of a bitumen can correspond to distillate and/or vacuum gas oil boiling range compounds. If a fractionation is performed to separate distillate and/or vacuum gas oil boiling range compounds from vacuum resid boiling range compounds, the particles in the bitumen can be concentrated in the vacuum resid boiling range compounds, which can also be referred to as a bottoms fraction or vacuum bottoms fraction. Such a fractionation can be beneficial for creating distillate and/or vacuum gas oil boiling range fractions that have sufficiently low particle contents to be ready for various types of additional processing. However, such fractionation can leave behind a bottoms fraction with a particle content of 300 wppm or more, or 1000 wppm or more, or 5000 wppm or more, such as up to 20000 wppm or possibly still higher.

Another type of heavy hydrocarbon fraction that can contain particles is a heavy hydrocarbon fraction where catalyst particles and/or fines are present in the process effluent. Slurry hydroprocessing is an example of a processing effluent that can include catalyst particles and/or fines in the processing effluent. Another type of processing effluent that can include catalyst fines is a bottoms fraction from a fluid catalytic cracking process. Such a bottoms fraction from fluid catalytic cracking is sometimes referred to as main column bottoms and/or catalytic slurry oil. The amount of particles present in a process effluent fraction can vary widely depending on the nature of the effluent. For example, the amount of catalyst used during slurry hydroprocessing can range from 50 wppm to 20000 wppm. Fractionation of the effluent can concentrate particles in the slurry hydroprocessing pitch or bottoms, so that the particle concentration in the bottoms fraction can range from 200 wppm to 100,000 wppm. As another example, catalytic slurry oils can include 500 wppm to 5000 wppm (or possibly more) of catalyst fines.

Some crude oil fractions and/or refinery streams can contain toluene insolubles and/or coke fines. Steam cracker tar is an example of a refinery stream that can include coke fines and toluene insolubles. Toluene insolubles can often correspond to compounds that are ready to precipitate or phase separate from a heavy hydrocarbon fraction, even if the compounds are still solvated by the fraction at a given time. In various aspects, the particle removal methods described herein can also be effective for removal of at least a portion of the toluene insolubles present in a fraction.

Solvent Addition and Hydrocarbon Recovery

In some aspects, an initial step for recovering hydrocarbons from a feed or effluent containing particles and/or toluene insolubles can be to fractionate the feed or effluent. Due to the nature of solids-liquid centrifuge configurations, it can be beneficial to reduce or minimize the amount of hydrocarbons that require separation from particles in the centrifuge. A convenient way of reducing the amount of hydrocarbons can be to perform a fractionation, such as a vacuum fractionation, to form a vacuum bottoms fraction. Alternatively, an atmospheric fractionation could be performed to form an atmospheric bottoms fraction. Still other options can involve using both an atmospheric separation and a vacuum separation. Yet other separation/fractionation options can include using flash separations and/or stripping, optionally in combination with atmospheric and/or vacuum fractionation. During fractionation, substantially all of the particles that are present within a feed are effluent can be concentrated in the bottoms fraction.

The size of the bottoms fraction can vary depending on a variety of factors. For example, for a bottoms fraction formed from a slurry hydroprocessing effluent, the size of the bottoms fraction can depend on how much conversion is performed during slurry hydroprocessing. The size of the bottoms fraction is also impacted by the cut point that is used to separate the highest boiling distillate fraction from the bottoms. In aspects where the bottoms fraction corresponds to a slurry hydroprocessing bottoms fraction, the combination of conversion in the slurry hydroprocessing environment and cut point for the bottoms fraction can be selected to produce a bottoms fraction that contains 4.0 vol % or more of the total hydrocarbons in the slurry hydroprocessing effluent, or 6.0 vol % or more, or 8.0 vol % or more, or 10 vol % or more, such as up to 25 vol % or possibly still higher. For example, the bottoms fraction can contain 4.0 vol % to 25 vol % of the total hydrocarbons in the slurry hydroprocessing effluent, or 6.0 vol % to 20 vol %, or 4.0 vol % to 15 vol %, or 10 vol % to 25 vol %, or 8.0 vol % to 25 vol %.

In various aspects, the bottoms fraction from the fractionation can then be mixed with a separation solvent. In some aspects, suitable solvents for methods as described herein include alkanes or other hydrocarbons (such as alkenes) containing 5 to 10 carbons per molecule, and mixtures thereof. Examples of suitable solvents include n-pentane, n-hexane, n-heptane $C_{5+}$ alkanes, $C_{6+}$ alkanes, $C_{5+}$ hydrocarbons, and $C_{6+}$ hydrocarbons.

In this discussion, a solvent comprising $C_n$ (hydrocarbons) is defined as a solvent composed of at least 80 wt % of alkanes (hydrocarbons) having n carbon atoms, or at least 85 wt %, or at least 90 wt %, or at least 95 wt %, or at least 98 wt %. Similarly, a solvent comprising $C_{n+}$ (hydrocarbons) is defined as a solvent composed of at least 80 wt % of alkanes (hydrocarbons) having n or more carbon atoms, or at least 85 wt %, or at least 90 wt %, or at least 95 wt %, or at least 98 wt %.

In this discussion, a solvent comprising $C_n$ alkanes (hydrocarbons) is defined to include the situation where the solvent corresponds to a single alkane (hydrocarbon) containing n carbon atoms (for example, n=5, 6, 7, 8, 9, 10) as well as the situations where the solvent is composed of a mixture of alkanes (hydrocarbons) containing n carbon atoms. Similarly, a solvent comprising $C_{n+}$ alkanes (hydrocarbons) is defined to include the situation where the solvent corresponds to a single alkane (hydrocarbon) containing n or more carbon atoms (for example, n=5, 6, 7, 8, 9, 10) as well as the situations where the solvent corresponds to a mixture of alkanes (hydrocarbons) containing n or more carbon atoms. Thus, a solvent comprising $C_{5+}$ alkanes can correspond to a solvent including n-pentane; a solvent include n-pentane and 2-methylbutane; a solvent corresponding to a mixture of one or more pentane isomers and one or more hexane isomers; or any other convenient combination of alkanes containing 5 or more carbon atoms. In various aspects, the separation solvent can consist essentially of hydrocarbons, so that at least 98 wt % or at least 99 wt % of the solvent corresponds to compounds containing only carbon and hydrogen.

The bottoms fraction can be mixed with the separation solvent in a volume ratio of solvent to bottoms fraction of from 1:1 to 10:1, or 1:1 to 8:1, or 3:1 to 10:1, or 3:1 to 8:1, or 5:1 to 10:1. The bottoms fraction can be mixed with the separation solvent at a temperature of 50° C. to 120° C., or 50° C. to 100° C., or 60° C. to 120° C., or 60° C. to 100° C. Typical solvent deasphalting temperatures range from 40° C. to 200° C., or 40° C. to 150° C., depending on the nature of the feed and the solvent. The pressure during mixing with the separation solvent can be from about 50 psig (345 kPag) to about 500 psig (3447 kPag).

Mixing the bottoms fraction with the separation solvent can result in formation of two phases. A first phase can correspond to an extract phase that includes the separation solvent and a majority of the hydrocarbons from the bottoms fraction. The second phase can correspond to a rejection phase that includes the solids content of the bottoms fraction, along with a smaller portion of the hydrocarbons. The hydrocarbons in the rejection phase can include at least a portion of the asphaltenes from the bottoms fraction. Although the rejection phase still has a high solids content, the hydrocarbons recovered from the extract phase can correspond to 50 wt % or more of the hydrocarbons from the bottoms fraction, or 60 wt % or more, or 75 wt % or more, such as up to 90 wt % or possibly still higher. Additionally or alternately, the amount of hydrocarbons remaining in the rejection phase can correspond to 50 wt % or less of the hydrocarbons from the bottoms fraction, or 40 wt % or less, or 30 wt % or less, or 20 wt % or less, such as down to 10 wt % or possibly still lower.

Separation of Extract Fraction and Rejection Fraction

After mixing of the bottoms fraction with the separation solvent, the mixture of bottoms fraction and separation solvent can optionally be held for a holding time prior to separating the phases. For example, in aspects where a feed includes both particles and toluene insolubles, holding the mixture of feed and solvent for a period of time prior to separation can allow for agglomeration or flocculation of toluene insolubles on the particles. This can assist with separation of particles and toluene insolubles from the desired hydrocarbon product. In some aspects, a holding time can allow individual particles to agglomerate into larger groupings of particles, which reduce the number of particles that remain in the hydrocarbon liquid product due to inability to overcome viscous resistance.

In some aspects, after mixing of feed and separation solvent, the mixture can be held for 15 minutes to 500 minutes, or 15 minutes to 150 minutes, or 60 minutes to 500 minutes, prior to passing the mixture into a centrifugal separation for separation of the phases. This holding time can occur within any convenient type of structure or vessel, but preferably turbulence is reduced or minimized during the holding time. One example of a suitable holding structure can be a conduit from the vessel for mixing the feed and separation solvent to the centrifugal separator. If the conduit is sufficiently large and long relative to the flow rate within the conduit, the travel time within the conduit can be sufficient to serve as a holding time. As another example, a settling tank can be included between the mixing vessel and the centrifugal separator to provide a desired holding time with reduced or minimized turbulence.

After any optional holding time, the two phases can then be separated into an extract fraction and a rejected fraction. In various aspects, the extract fraction can have a solids content of 300 wppm or less, or 250 wppm or less, or 150 wppm or less, or 100 wppm or less, such as down to 1 wppm or possibly still lower. The desired hydrocarbons can be recovered from the extract fraction by removal of the separation solvent.

In various aspects, the extract phase can be separated from the rejection phase using a solids-liquid centrifugal separator. A centrifugal separator uses rotational forces enhance gravity-based phase separation. This can reduce or minimize the amount of hydrocarbon liquid that is lost as part of the rejected phase.

Various types of solids-liquid centrifugal separators are available. Some configurations correspond to a disk-stack centrifuge. In a disc-stack centrifuge configuration, liquid can be removed from a central (typically top) location on the centrifuge, while solids can accumulate in a collection volume at the periphery of the centrifuge. The collected solids can be periodically removed to allow for continued operation of the centrifuge.

Another type of configuration is horizontal decanter centrifuge, as shown in FIG. 1. Horizontal decanter centrifuges can be used for separation of solid-liquid slurries. In FIG. 1, a feed is passed into decanter centrifuge 100 through inlet 120. The feed can correspond to a mixture of a heavy hydrocarbon fraction 110 and a separation solvent 105. The feed is passed into horizontally mounted bowl 130. The horizontally mounted bowl 130 rotates about a horizontal axis, which allows for a density based separation of solids and liquids within the horizontally mounted bowl 130. The bowl 130 includes a cylinder portion 132 and a cone portion 135. In various aspects, the particles and toluene insolubles in a heavy hydrocarbon fraction can have a higher density than the desired hydrocarbons. As a result, the centrifugal forces generated by the bowl 130 can cause the solids within the feed to be preferentially driven to the edge 140 of the cylinder portion 132 of bowl 130. The decanter centrifuge 100 can also include a screw or scroll conveyor 150 inside of the bowl 130. The screw conveyor 150 can rotate at a different speed than bowl 130. This can force the solids to travel toward the cone portion 135 of bowl 130, where the solids 158 can exit via discharge opening 155. The remaining liquid (hydrocarbons) 168 in the bowl can travel the other direction and exit from the bowl 130 via one or more openings 160, such as an annular opening.

Configuration Example—Separation of Particles from Slurry Hydroprocessing Effluent In various aspects, a heavy hydrocarbon feed can be exposed to slurry hydroprocessing conditions to form a slurry hydroprocessing effluent. Examples of heavy hydrocarbon feeds include, but are not limited to, heavy crude oils, oils (such as bitumen) from oil sands, and heavy oils derived from coal, and blends of such feeds. In some aspects, heavy hydrocarbon feeds can also include at least a portion corresponding to a heavy refinery fraction, such as distillation residues, heavy oils coming from catalytic treatment (such as heavy cycle slurry oils or main column bottoms from fluid catalytic cracking), and/or thermal tars (such as oils from visbreaking, steam cracking, or similar thermal or non-catalytic processes). Heavy hydrocarbon feeds can be liquid or semi-solid. Such heavy hydrocarbon feeds can include a substantial portion of the feed that boils at 650° F. (343° C.) or higher. For example, the portion of a heavy hydrocarbon feed that boils at less than 650° F. (343° C.) can correspond to 5 wt % to 40 wt % of the feed, or 10 wt % to 30 wt % of the feed, or 5 wt % to 20 wt % of the feed. In such aspects, the heavy hydrocarbon feed can have a T40 distillation point of 343° C. or higher, or a T30 distillation point of 343° C. or higher, or a T20 distillation point of 343° C. or higher. Additionally or alternately, a substantial portion of a heavy hydrocarbon feed can also correspond to compounds with a boiling point of 566° C. or higher. In some aspects, 50 wt % or more of a heavy hydrocarbon feed can have a boiling point of 566° C. or more, or 60 wt % or more, or 70 wt % or more, or 80 wt % or more, such as up to substantially all of the heavy hydrocarbon feed corresponding to components with a boiling point of 566° C. or more. In some aspects, 50 wt % or more of a heavy hydrocarbon feed can have a boiling point of 593° C. or more, or 60 wt % or more, or 70 wt % or more, or 80 wt % or more, such as up to substantially all of the heavy hydrocarbon feed corresponding to components with a boiling point of 593° C. or more. In this discussion, boiling points can be determined by a convenient method, such as ASTM D2887, ASTM D7169, or another suitable standard method.

Density, or weight per volume, of the heavy hydrocarbon can be determined according to ASTM D287-92 (2006) Standard Test Method for API Gravity of Crude Petroleum and Petroleum Products (Hydrometer Method), and is provided in terms of API gravity. In general, the higher the API gravity, the less dense the oil. API gravity can be 16° or less, or 12° or less, or 8° or less.

Heavy hydrocarbon feeds can be high in metals. For example, the heavy hydrocarbon feed can be high in total nickel, vanadium and iron contents. In one embodiment, the heavy oil will contain at least 0.00005 grams of Ni/V/Fe (50 ppm) or at least 0.0002 grams of Ni/V/Fe (200 ppm) per gram of heavy oil, on a total elemental basis of nickel, vanadium and iron. In other aspects, the heavy oil can contain at least about 500 wppm of nickel, vanadium, and iron, such as at least about 1000 wppm.

Heteroatoms such as nitrogen and sulfur are typically found in heavy hydrocarbon feeds, often in organically-bound form. Nitrogen content can range from about 0.1 wt % to about 3.0 wt % elemental nitrogen, or 1.0 wt % to 3.0 wt %, or 0.1 wt % to 1.0 wt %, based on total weight of the heavy hydrocarbon feed. The nitrogen containing compounds can be present as basic or non-basic nitrogen species. Examples of basic nitrogen species include quinolines and substituted quinolines. Examples of non-basic nitrogen species include carbazoles and substituted carbazoles.

The invention is particularly suited to treating heavy oil feedstocks containing at least 0.1 wt % sulfur, based on total weight of the heavy hydrocarbon feed. Generally, the sulfur content can range from 0.1 wt % to 10 wt % elemental sulfur, or 1.0 wt % to 10 wt %, or 0.1 wt % to 5.0 wt %, or 1.0 wt % to 7.0 wt %, based on total weight of the heavy hydrocarbon feed. Sulfur will usually be present as organically bound sulfur. Examples of such sulfur compounds include the class of heterocyclic sulfur compounds such as thiophenes, tetrahydrothiophenes, benzothiophenes and their higher homologs and analogs. Other organically bound sulfur compounds include aliphatic, naphthenic, and aromatic mercaptans, sulfides, and di- and polysulfides. In some aspects involving slurry hydroconversion as the hydroconversion stage, higher sulfur feeds can be preferred, as carbon-sulfur bonds can tend to be the first to break under slurry hydroconversion conditions.

Heavy hydrocarbon feeds can be high in n-heptane asphaltenes. In some aspects, the heavy hydrocarbon feed can contain 5 wt % to 80 wt % of n-heptane asphaltenes, or 5 wt % to 60 wt %, or 5 wt % to 50 wt %, or 20 wt % to 80 wt %, or 10 wt % to 50 wt %, or 20 wt % to 60 wt %. In aspects where the heavy hydrocarbon feed includes a portion of a bitumen formed by conventional paraffinic froth treatment of oil sands, the heavy hydrocarbon feed can contain 10 wt % to 30 wt % of asphaltenes.

Still another method for characterizing a heavy hydrocarbon feed is based on the Conradson carbon residue of the feedstock, or alternatively the micro carbon residue content. The Conradson carbon residue/micro carbon residue content of the feedstock can be 5.0 wt % to 50 wt %, or 5.0 wt % to 30 wt %, or 10 wt % to 40 wt %, or 20 wt % to 50 wt %.

In addition to the above properties, another consideration for a heavy hydrocarbon feedstock is the particle content. For crude oils derived from conventional extraction sites, the particle content of the crude oil is typically low. However, an increasing proportion of crude oil production corresponds to non-traditional crudes, such as crude oils derived from oil sands. Initial extraction of non-traditional crudes can present some additional challenges. For example, during mining or extraction of oil sands, a large percentage of non-petroleum material (such as sand) is typically included in the raw product.

The particle content and/or content of other non-petroleum materials of oil sands can be quite large, corresponding to 30 wt % or more of the product. An initial reduction in the particle content can be performed by first mixing the raw product with water. Air is typically bubbled through the water to assist in separating the bitumen from the non-petroleum material. This will remove a large proportion of the solid, non-petroleum material in the raw product. However, smaller particles of non-petroleum particulate solids will typically remain with the oil phase at the top of the mixture, such as clay fines. This top oil phase is sometimes referred to as a froth. The particles in this froth can still correspond to 5.0 wt % or more of the froth, or 10 wt % or more, such as up to 20 wt % or possibly still higher.

Separation of the smaller non-petroleum particulate solids can be achieved by adding an extraction solvent to the froth of the aqueous mixture. This is referred to as a froth treatment. Examples of froth treatments include paraffinic froth treatment (PFT) and naphthenic froth treatment (NFT). For paraffinic froth treatment, typical solvents include isopentane, pentane, and other light paraffins (such as $C_5$-$C_8$ paraffins) that are liquids at room temperature. Other solvents such as $C_3$-$C_{10}$ alkanes might also be suitable for use as an extraction solvent for forming an asphaltene-depleted crude, depending on the conditions during the paraffinic froth treatment. For naphthenic froth treatment, a mixture of naphtha boiling range compounds can be used, where the mixture includes aromatics, naphthenes, and optionally paraffins. It is noted that the extraction solvents for paraffinic froth treatment roughly correspond to naphtha boiling range compounds as well, so that the difference between the solvents for PFT and NFT is based on compound class (aromatic, naphthene, paraffin) rather than boiling range.

During a froth treatment, adding the extraction solvent to the froth results in a two phase mixture, with the crude and the extraction solvent forming one of the phases. The smaller particulate solids of non-petroleum material are "rejected" from the oil phase and join the aqueous phase. The crude oil and solvent phase can then be separated from the aqueous phase. During conventional paraffinic froth treatment, after separation from the aqueous phase, the resulting bitumen can have a combined water and particle content of 1.0 wt % or less. This can include a particle content of 500 wppm or more, or 1000 wppm or more, or 3000 wppm or more. Higher particle contents can be present in bitumen formed using naphthenic froth treatment.

Slurry hydroprocessing is an example of a type of hydroconversion that can be performed under limited severity conditions and that can also allow for withdrawal and addition of catalyst during operation of the hydroconversion process. In a reaction system, slurry hydroprocessing can be performed by processing a feed in one or more slurry hydroprocessing reactors. In some aspects, the slurry hydroprocessing can be performed in a single reactor, or in a group of parallel single reactors. The reaction conditions in a slurry hydroconversion reactor can vary based on the nature of the catalyst, the nature of the feed, the desired products, and/or the desired amount of conversion.

With regard to catalyst, several options are available. In some aspects, the catalyst can correspond to one or more catalytically active metals in particulate form and/or supported on particles. In other aspects, the catalyst can correspond to particulates that are retained within the heavy hydrocarbon feed after using a froth treatment to form the feed. In still other aspects, a mixture of catalytically active metals and particulates retained in the heavy hydrocarbon feed can be used.

In aspects where a catalytically active metal is used as the catalyst, suitable catalyst concentrations can range from about 50 wppm to about 50,000 wppm (or roughly 5.0 wt %), depending on the nature of the catalyst. Catalyst can be incorporated into a hydrocarbon feedstock directly, or the catalyst can be incorporated into a side or slip stream of feed and then combined with the main flow of feedstock. Still another option is to form catalyst in-situ by introducing a catalyst precursor into a feed (or a side/slip stream of feed) and forming catalyst by a subsequent reaction.

Catalytically active metals for use in slurry hydroprocessing/hydroconversion can include those from Groups 4-10 of the IUPAC Periodic Table. Examples of suitable metals include iron, nickel, molybdenum, vanadium, tungsten, cobalt, ruthenium, and mixtures thereof. The catalytically active metal may be present as a solid particulate in elemental form or as an organic compound or an inorganic compound such as a sulfide or other ionic compound. Metal or metal compound nanoaggregates may also be used to form the solid particulates.

A catalyst in the form of a solid particulate is generally a compound of a catalytically active metal, or a metal in elemental form, either alone or supported on a refractory material such as an inorganic metal oxide (e.g., alumina, silica, titania, zirconia, and mixtures thereof). Other suitable refractory materials can include carbon, coal, and clays. Zeolites and non-zeolitic molecular sieves are also useful as solid supports. One advantage of using a support is its ability to act as a "coke getter" or adsorbent of asphaltene precursors that might otherwise lead to fouling of process equipment.

In some aspects, it can be desirable to form catalyst for slurry hydroprocessing in situ, such as forming catalyst from a metal sulfate catalyst precursor or another type of catalyst precursor that decomposes or reacts in the hydroconversion reaction zone environment, or in a pretreatment step, to form a desired, well-dispersed and catalytically active solid particulate. Precursors also include oil-soluble organometallic compounds containing the catalytically active metal of interest that thermally decompose to form the solid particulate having catalytic activity. Other suitable precursors include metal oxides that may be converted to catalytically active (or more catalytically active) compounds such as metal sulfides.

The reaction conditions within a slurry hydroprocessing reactor that correspond to a selected conversion amount can include a temperature of 400° C. to 480° C., or 425° C. to 480° C., or 450° C. to 480° C. Some types of slurry hydroprocessing reactors are operated under high hydrogen partial pressure conditions, such as having a hydrogen partial pressure of 1000 psig (6.39 MPag) to 3400 psig (23.4 MPag), for example at least 1200 psig (8.3 MPag), or at least about 1500 psig (10.3 MPag). Examples of hydrogen partial pressures can be 1000 psig (6.9 MPag) to 3000 psig (20.7 MPag), or 1000 psig (8.3 MPag) to 2500 psig (17.2 MPag), or 1500 psig (10.3 MPag) to 3400 psig (23.4 MPag), or 1000 psig (6.9 MPag) to 2000 psig (13.8 MPag), or 1200 psig (8.3 MPag) to 2500 psig (17.2 MPag). Since the catalyst is in slurry form within the feedstock, the space velocity for a slurry hydroconversion reactor can be characterized based on the volume of feed processed relative to the volume of the reactor used for processing the feed. Suitable space velocities for slurry hydroconversion can range, for example, from about 0.05 $v/v/hr^{-1}$ to about 5 $v/v/hr^{-1}$, such as about 0.1 $v/v/hr^{-1}$ to about 2 $v/v/hr^{-1}$.

The slurry hydroprocessing stage can be operated at a net conversion of 60 wt % to 89 wt %, relative to a conversion temperature of 524° C., or 70 wt % to 89 wt %, or 60 wt % to 85 wt %, or 70 wt % to 85 wt %, or 75 wt % to 89 wt %. Optionally but preferably, the slurry hydroprocessing stage can correspond to a single slurry hydroprocessing reactor, as opposed to having a plurality of reactors arranged in series. In some aspects, the net conversion can substantially correspond to the per-pass conversion in the slurry hydroprocessing reactor. In other aspects, a portion of the pitch or unconverted bottoms from the slurry hydroprocessing reactor can be recycled. In such aspects, the per-pass conversion can be significantly lower, such as having a per-pass conversion of 60 wt % or less, or 50 wt % or less, or 40 wt % or less, relative to 524° C. or alternatively relative to 566° C.

Figure 2:
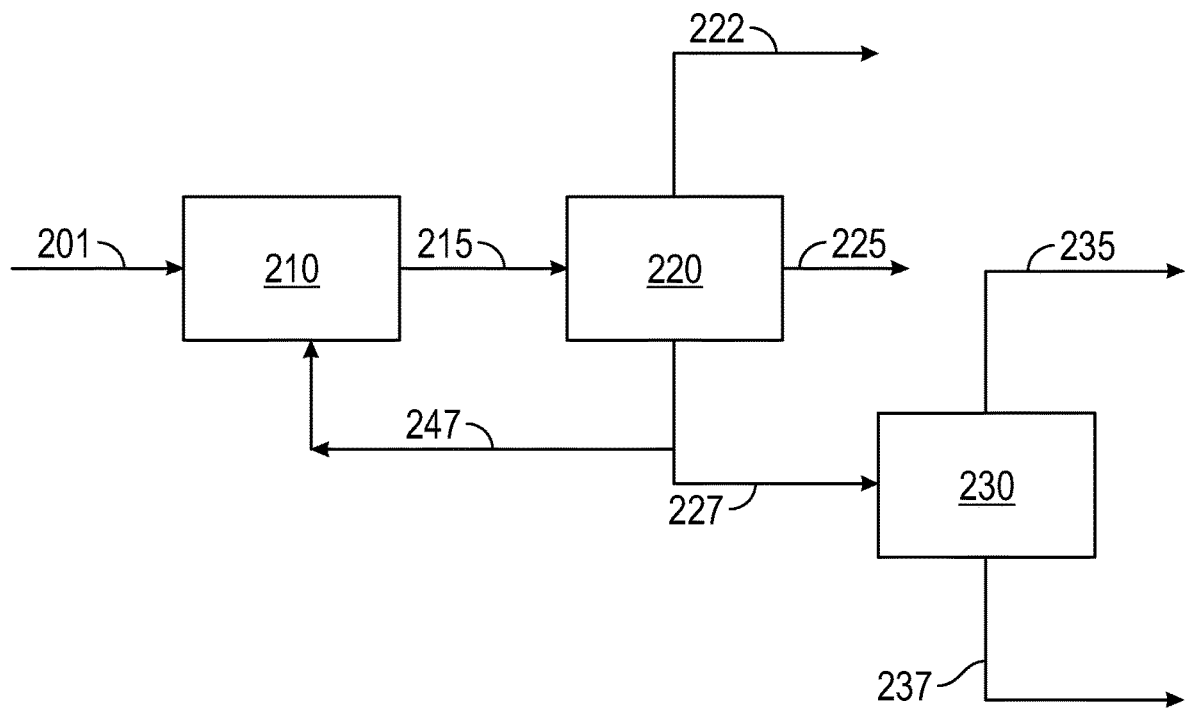
FIG. 2 shows an example of a configuration for generating a slurry hydrocracking effluent.

FIG. 2 shows an example of a process flow and configuration for improving hydrocarbon recovery from a slurry hydroprocessing effluent. In FIG. 2, a heavy hydrocarbon feedstock 201 is introduced into a slurry hydroprocessing stage 210 (such as one or more slurry hydroprocessing reactors). In some aspects, the feedstock 201 can include a substantial quantity of solids prior to entering the slurry hydroprocessing stage. For example, a heavy hydrocarbon feed including bitumen formed from a froth treatment can include a substantial quantity of particles, depending on the nature and severity of the froth treatment. Additional catalyst particles are added in slurry hydroprocessing stage 210 in order to perform the slurry hydroprocessing.

The slurry hydroprocessing stage 210 generates a slurry hydroprocessing effluent 215. The slurry hydroprocessing effluent 215 can then be fractionated in fractionation stage 220 to form at least one or more lighter hydrocarbon products 222, one or more liquid products 225, and a bottoms fraction 227. The fractionation stage 220 can include any convenient type and/or combination of separators. In some aspects, the fractionation can be performed by first passing slurry hydroprocessing effluent 215 into an atmospheric fractionation tower, and then passing the atmospheric bottoms into a vacuum fractionation tower. As an alternative to an atmospheric fractionation tower, one or more flash separation drums (not shown) could be used. The vacuum bottoms 227 can then be passed into solvent separation stage 230. Alternatively, the atmospheric bottoms could be passed directly into solvent separation stage 230, although this would increase the amount of hydrocarbons that require recovery in solvent separation stage 230. In still other aspects, a vapor-liquid separator can potentially be used in place of the atmospheric fractionation tower and/or the vacuum fractionation tower. Due to the relatively high temperatures used in a slurry hydroprocessing stage 210, the vapor portion of the slurry hydroprocessing effluent can potentially include components with a boiling point of up to 400° C., or possibly higher. The bottoms from such a vapor-liquid separator could be used directly as the input for solvent separation 230. Alternatively, a vacuum fractionation can be performed on the bottoms from the vapor-liquid separator to reduce the volume of hydrocarbons that are passed into the solvent separation stage 230.

In solvent separation stage 230, the bottoms product 227 is mixed with a separation solvent and then separated into an extract product 235 and a rejection stream 237. Optionally, solvent separation stage 230 can also include a settling tank or other holding vessel so that the mixture of bottoms product 225 and separation solvent can be held for a holding time prior to separation. The extract product 235 can include a majority of the separation solvent and 50 wt % or more of the hydrocarbons that were in bottoms product 227. Preferably, the rejection stream can include 90 wt % or more of the solids from bottoms product 227. After solvent separation, the separation solvent and the hydrocarbons in extract product 235 can be recovered in any convenient manner, such as by distillation.

In some optional aspects, a portion 247 of bottoms product 227 can be recycled back to slurry hydroprocessing stage 210. This can be referred to as recycling a portion of the bottoms or "pitch" back to the slurry hydroprocessing reactor. Recycling a portion 247 of the pitch back to the slurry hydroprocessing stage 210 causes the net feed to the slurry hydroprocessing stage to have a higher boiling range. Net conversion can increase at fixed severity (i.e., fixed single pass conversion), as pitch that is not converted during the first pass can potentially be recycled 247 for subsequent passes through the slurry hydroprocessing stage 210. This also recycles particles back to the slurry hydroprocessing stage, resulting in a higher concentration of particles in the bottoms product 227 that is passed into solvent extraction. Thus, combining pitch recycle for slurry hydroprocessing with solvent extraction can provide synergistic benefits. Using pitch recycle can increase net conversion while having lower single pass conversion, allowing for increased liquid products while reducing or minimizing production of lower value gas phase products. The pitch recycle also results in a higher concentration of solids in the slurry hydroprocessing pitch, but this higher concentration can be efficiently removed by using a separation solvent in combination with a centrifugal separator, thus providing a still greater liquid hydrocarbon yield.

Additional Embodiments

Embodiment 1. A method for performing a separation on a heavy hydrocarbon feed, comprising: fractionating a heavy hydrocarbon feed to form a bottoms fraction and one or more higher boiling fractions, the bottoms fraction comprising a solids content of 500 wppm or more and a hydrocarbon content; mixing a separation solvent comprising a $C_5$-$C_{10}$ hydrocarbon with at least a portion of the bottoms fraction at a temperature of 50° C. to 150° C. to form a mixture comprising an extract phase comprising less than 300 wppm of solids and a rejected phase comprising a solids content of 1000 wppm or more, the extract phase comprising at least a portion of the separation solvent and 50 vol % or more of the hydrocarbon content of the bottoms fraction, a volume ratio of the separation solvent to the bottoms fraction being 1:1 or more; and separating the extract phase from the rejected phase in a centrifugal separator.

Embodiment 2. The method of Embodiment 1, further comprising separating the extract phase to form a solvent recovery fraction comprising the at least a portion of the separation solvent and a second fraction, the second fraction comprising 50 vol % or more of the hydrocarbon content of the bottoms fraction.

Embodiment 3. The method of Embodiment 1 or 2, wherein the centrifugal separator comprises at least one of a decanter centrifuge and a disc-stack centrifuge.

Embodiment 4. The method of Embodiment 3, wherein the second fraction comprises 75 vol % or more of the hydrocarbon content of the bottoms fraction.

Embodiment 5. The method of any of Embodiments 1 to 4, the method further comprising holding the mixture for a holding time of 15 minutes to 500 minutes prior to the separating of the extract phase from the rejected phase.

Embodiment 6. The method of any of Embodiments 1 to 5, wherein the extract phase comprises a solids content of 100 wppm or less.

Embodiment 7. The method of any of Embodiments 1 to 6, wherein the bottoms fraction comprises a solids content of 5000 wppm or more.

Embodiment 8. The method of any of Embodiments 1 to 7, further comprising exposing a feedstock to slurry hydroprocessing conditions to form the heavy hydrocarbon feed.

Embodiment 9. The method of Embodiment 8, further comprising mixing a second portion of the bottoms fraction with the feedstock prior to exposing the feedstock to the slurry hydroprocessing conditions.

Embodiment 10. The method of Embodiment 8 or 9, wherein the slurry hydroprocessing effluent comprises a hydrocarbon content, the bottoms fraction comprising 25 vol % or less of the total hydrocarbon content of the slurry hydroprocessing effluent.

Embodiment 11. The method of Embodiment 10, wherein the bottoms fraction comprises 4.0 vol % to 20 vol % of the total hydrocarbon content of the slurry hydroprocessing effluent.

Embodiment 12. The method of any of Embodiments 8 to 11, wherein the bottoms fraction comprises 8.0 vol % or more of the total hydrocarbon content of the slurry hydroprocessing effluent.

Embodiment 13. The method of any of Embodiments 8 to 12, wherein the solids content of the bottoms fraction comprises solid particles derived from oil sands.

Embodiment 14. The method of any of Embodiments 8 to 13, wherein the rejected phase comprises 5.0 vol % or less of the hydrocarbon content of the slurry hydroprocessing effluent.

Embodiment 15. The method of any of Embodiments 8 to 14, wherein the rejected phase comprises 3.0 vol % or less of the hydrocarbon content of the slurry hydroprocessing effluent.

Embodiment 16. The method of any of Embodiments 8 to 15, wherein the bottoms fraction comprises 500 wppm or more of catalyst particles.

Embodiment 17. The method of any of Embodiments 8 to 16, wherein the bottoms fraction comprises 5000 wppm or more of catalyst particles.

Embodiment 18. The method of any of Embodiments 1 to 17, wherein the bottoms fraction comprises a pyrolysis tar.

Embodiment 19. The method of any of Embodiments 1 to 17, wherein the heavy hydrocarbon feed comprises a bitumen derived from oil sands.

Embodiment 20. A system for performing a separation on a heavy hydrocarbon feed, comprising: a vacuum fractionator comprising a fractionator inlet, one or more distillate product outlets, and a bottoms outlet; a solvent mixing stage comprising a solvent inlet, a feed inlet in fluid communication with the bottoms outlet, and a mixture outlet; at least one of a holding tank and a settling tank; and a centrifugal separator comprising a separator inlet and a separator outlet, the separator inlet being in fluid communication with the mixture outlet via the at least one of a holding tank and a settling tank.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for performing a separation on a heavy hydrocarbon feed, comprising:
   fractionating a heavy hydrocarbon feed to form a bottoms fraction and one or more higher boiling fractions, the bottoms fraction comprising a solids content of 500 wppm or more and a hydrocarbon content;
   mixing a separation solvent comprising a C5-C10 hydrocarbon with at least a portion of the bottoms fraction at a temperature of 50° ° C. to 150° C. to form a mixture comprising an extract phase comprising less than 300 wppm of solids and a rejected phase comprising a solids content of 1000 wppm or more, the extract phase comprising at least a portion of the separation solvent and 50 vol % or more of the hydrocarbon content of the bottoms fraction, a volume ratio of the separation solvent to the bottoms fraction being 1:1 or more; and
   separating the extract phase from the rejected phase in a centrifugal separator.

2. The method of claim 1, further comprising separating the extract phase to form a solvent recovery fraction comprising the at least a portion of the separation solvent and a second fraction, the second fraction comprising 50 vol % or more of the hydrocarbon content of the bottoms fraction.

3. The method of claim 1, wherein the centrifugal separator comprises at least one of a decanter centrifuge and a disc-stack centrifuge.

4. The method of claim 1, the method further comprising holding the mixture for a holding time of 15 minutes to 500 minutes prior to the separating of the extract phase from the rejected phase.

5. The method of claim 1, wherein the extract phase comprises a solids content of 100 wppm or less.

6. The method of claim 1, wherein the bottoms fraction comprises a solids content of 5000 wppm or more.

7. The method of claim 1, further comprising exposing a feedstock to slurry hydroprocessing conditions to form the heavy hydrocarbon feed, the bottoms fraction optionally comprising 500 wppm or more of catalyst particles.

8. The method of claim 7, further comprising mixing a second portion of the bottoms fraction with the feedstock prior to exposing the feedstock to the slurry hydroprocessing conditions.

9. The method of claim 7, wherein the slurry hydroprocessing effluent comprises a hydrocarbon content, the bottoms fraction comprising 25 vol % or less of the total hydrocarbon content of the slurry hydroprocessing effluent.

10. The method of claim 7, wherein the bottoms fraction comprises 4.0 vol % to 20 vol % of the total hydrocarbon content of the slurry hydroprocessing effluent.

11. The method of claim 7, wherein the rejected phase comprises 5.0 vol % or less of the hydrocarbon content of the slurry hydroprocessing effluent.

12. The method of claim 1, wherein the solids content of the bottoms fraction comprises solid particles derived from oil sands, or wherein the heavy hydrocarbon feed comprises a bitumen derived from oil sands, or a combination thereof.

13. An extract phase formed according to the method of claim 1.

14. A rejected phase formed according to the method of claim 1.

15. A system for performing a separation on a heavy hydrocarbon feed, comprising:
   a vacuum fractionator comprising a fractionator inlet, one or more distillate product outlets, and a bottoms outlet;
   a solvent mixing stage comprising a solvent inlet, a feed inlet in fluid communication with the bottoms outlet, and a mixture outlet;
   at least one of a holding tank and a settling tank; and
   a centrifugal separator comprising a separator inlet and a separator outlet, the separator inlet being in fluid communication with the mixture outlet via the at least one of a holding tank and a settling tank.

* * * * *